Dec. 19, 1950 H. O. MARCY, III 2,534,610

APPARATUS FOR TELEVISING DATA ON A PLAN POSITION INDICATOR TUBE

Filed Aug. 11, 1948 2 Sheets-Sheet 1

INVENTOR
HENRY O. MARCY 3rd.
BY Paul Holinski
ATTORNEY

Dec. 19, 1950 H. O. MARCY, III 2,534,610

APPARATUS FOR TELEVISING DATA ON A PLAN POSITION INDICATOR TUBE

Filed Aug. 11, 1948 2 Sheets-Sheet 2

Inventor

HENRY O. MARCY 3rd

By Pamellolinck

Attorney

Patented Dec. 19, 1950 2,534,610

UNITED STATES PATENT OFFICE 2,534,610

APPARATUS FOR TELEVISING DATA ON A PLAN POSITION INDICATOR TUBE

Henry O. Marcy, 3rd, Park Ridge, Ill., assignor to The Rauland Corporation, Chicago, Ill., a corporation of Illinois Application August 11, 1948, Serial No. 43,588

9 Claims. (Cl. 178—6.8)

Figures 1, 2:
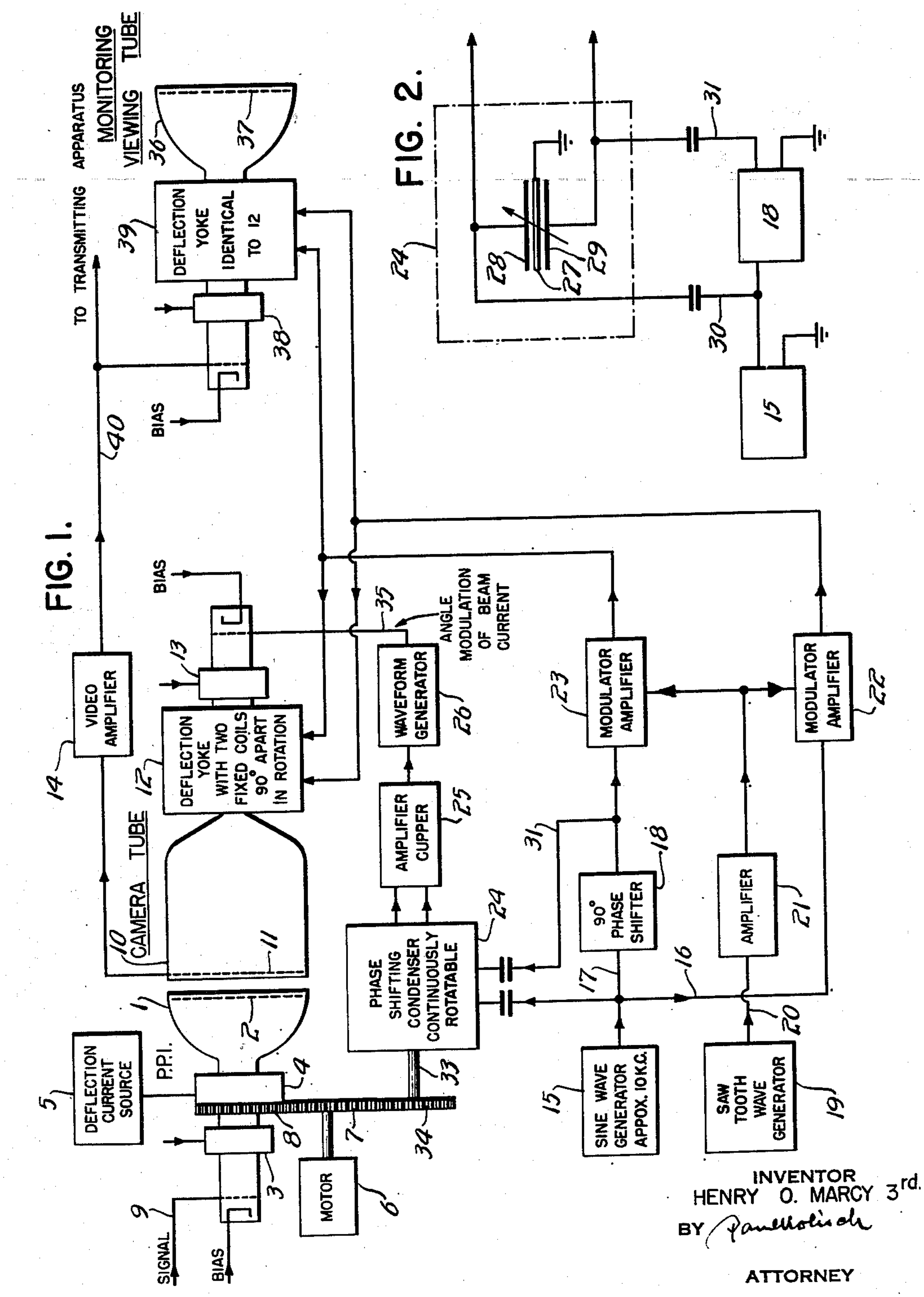

This invention relates to television apparatus. More particularly it relates to improvements in apparatus for televising and transmitting data visually represented in a polar plot on the screen of a cathode ray plan-position indicator tube.

As is well known, there are many applications in which it is desirable to televise the polar plot presented on the plan position indicator of radio detection and ranging apparatus and to do so with a minimum of distortion so that the data which it represents will be transmitted with a high degree of accuracy.

Conventional television pick-up apparatus has proven to be unsatisfactory for such applications for a number of reasons. For one thing, it employs a square or rectangular scanning raster comprising a succession of parallel lines for analyzing the image to be picked up. Because of this if there should be any non-linearity in the central portions either of the high frequency sweep voltages (or currents) or of the low frequency ones, even if percentagewise they represent but very small variations, there will result distortion of the televised polar plot in its critical central area so that the data which it represents will be transmitted quite inaccurately. In other words, the lack of correspondence between the nature of the polar scanning of the plan position indicator and the rectangular scanning of the pick-up tube will lead to the possibility of intolerable distortions of the intelligence to be transmitted when the scanning raster of the pick-up tube is somewhat inaccurate in its central area—even though its inaccuracy may be very slight according to ordinary standards.

Moreover, conventional scanning circuits are very expensive because a line-by-line raster in which successive high frequency sweeps are in the same direction requires both high retrace speeds—for permitting efficient utilization of the available transmission channel—and very great synchronization precision for avoiding jitter.

In addition, it is wasteful to use a rectangular (or even a square) raster for analyzing a round image inasmuch as a large portion of the mosaic is not used. As one consequence, since the unused area must be swept, much of the deflection energy is wasted and the expensive sweep circuits are not used to best advantage. As another, since the round flared-out target end of the camera tube must be big enough to house a rectangular target which, in turn, must be big enough to receive the round polar-plot image, then the camera tube will need to be inordinately larger than the indicator tube.

Moreover, there is also a problem of the contrast range which is required of a camera tube for applications of this kind. The polar plot produced on plan position indicator comprises a radial sweep which is systematically angularly displaced about one of its end, i. e. the center of the screen, and which produces brilliant transient light variations as it passes over and writes data onto the screen, the data thereafter having the form of a slowly decaying persistent image by which it is recorded for a period of time equal to perhaps several revolutions of the sweep. The contrast ratio between the brilliant transient flashes and the persistent image may be of the order of 1000 to 1. Since the contrast range of the pick-up tube, when it is left adjusted at some fixed operating level of sensitivity, is very much less than 1000 to 1, the image reproduced at receiving stations (or shown at a monitoring viewing tube) will not be a faithful reproduction of the one received by the camera tube. It has been noted empirically that the reproduced image is very seriously defocused. One solution would be to modulate the beam current of the camera tube to control its sensitivity at any instant in accordance with the relative intensity of a picture element then being scanned so that its effective contrast range will be very much increased. For example, assuming that the rate of angular displacement of the radial sweep is low as compared with the high frequency component of the scanning of the camera tube, the beam current of the camera tube could be sharply reduced during each time that the projection of its cathode ray, in analyzing the polar-plot image on its photosensitive mosaic, catches up with, starts to cross, and traverse the radial sweep, i. e., whenever its position coincides with the locus of the brillian transient flashes produced by the plan position indicator. However, to accomplish this with a rectangular raster is very difficult for, while it is mathematically possible to define all points at which the beam projection of the camera tube coincides with the radial sweep of the indicator tube—defining said points by a formula which is a function of the instantaneous angular position of the radial sweep, the instantaneous value of the low frequency sweep, and the instantaneous value of the high frequency sweep which is in progress at the instant of the low frequency sweep—it would be difficult successfully to implement that formula in a practical circuit, first, because the lack of correspondence between the two types of scans would result in a relatively complex relationship (and hence would require a relatively complex circuit), and second, because the reliability of its operation would be seriously effected by any non-linearity of the sweeps. On the other hand, where both the camera tube and the indicator tube employ polar scanning, it becomes relatively easy to devise simple and reliable circuits for controlling the beam current of the camera tube in the manner indicated.

As will be shown herein, once satisfactory circuits have been devised for abruptly reducing the beam current of the camera tube each time that it is analyzing a brilliant portion of the polar plot, it then becomes an easy matter to add a further refinement. Where the scanning means of the two tubes are such that their angular scanning components move in opposite directions, this is done by employing means effective after each abrupt reduction in the camera beam current to restore said current to its former value gradually—rather than with equal abruptness—at a varying rate which at first is related to the rate of decay of the flash emissions and later to that of the ensuing persistent emissions. Where the angular components move in the same direction and the analyzing beam projection periodically overtakes the radial sweep, it would be expedient to provide means for progressively decreasing the camera tube beam current as the projection approaches the sweep; for continuing to do this until the beam current reaches a minimum value during the crossing of the sweep by the projection; and for then abruptly restoring it.

It is an object of the present invention to devise apparatus for televising data visually represented on the screen of a plan position indicator tube employing for said apparatus a camera tube having a circular mosaic of about the same size as the screen of the indicator tube and using polar scanning.

It is a further object of this invention to devise an apparatus as indicated above and in which small errors in the scanning of the central portion of the camera tube target will not produce inordinately large errors in the accuracy of the transmitted data.

It is a further object of this invention to devise an apparatus as indicated above so that it will include means for modulating the beam current of the camera tube to control its sensitivity at any instant in accordance with the relative intensity of that particular picture element, of the polar-plot image, which is then being scanned whereby in effect its contrast range will be increased.

Figure 2A:
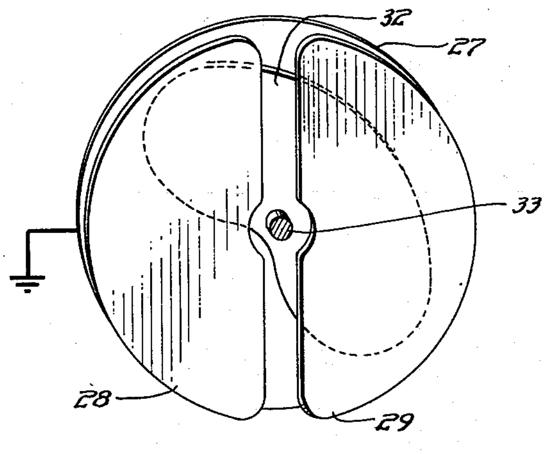
Figure 3:
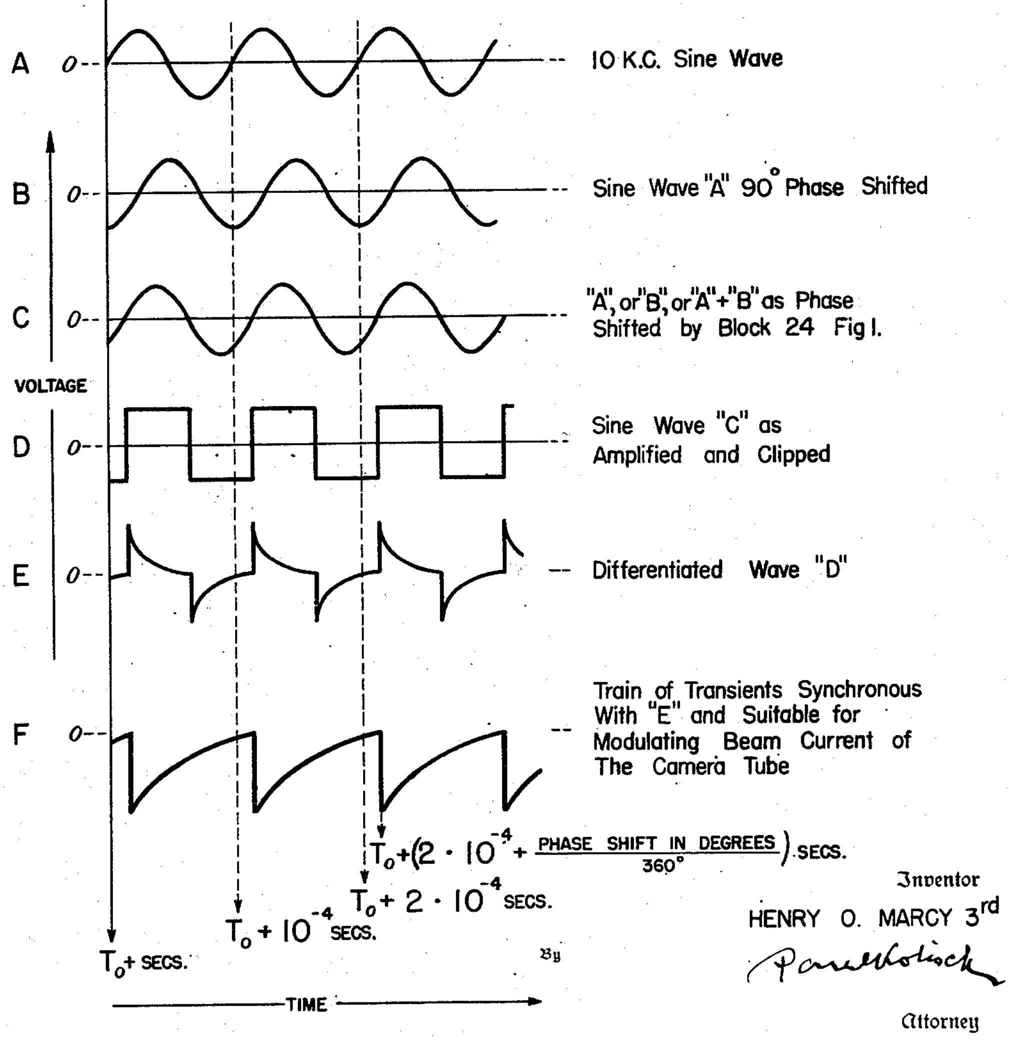

Other objects, features and advantages of this invention will be apparent from the following description and from the drawing, in which:

Fig. 1 is a block diagram of an illustrative embodiment of this invention;

Figs. 2 and 2*a* illustrate electrical and structural details of one of the blocks shown in Fig. 1, i. e. the block representing a continuously rotatable phase-shifting condenser; and Fig. 3 is a family of plots of time vs. voltage each showing the wave form which occurs at predetermined circuit points of the arrangement shown in Fig. 1.

In the embodiment which is shown herein, the plan position indicator is represented as having a preferred scanning means comprising a rotatable magnetic deflection coil and a source of periodic sawtooth currents feeding that coil. This type of arrangement is preferred for some applications because it works well whether the coil is rotated at a uniform rate; is rotated at a non-uniform rate; is oscillated; or is brought to a full stop, whereas some all-electronic scanning arrangements only work satisfactorily for producing continuous rotation at a uniform rate. On the other hand, the camera tube is represented as employing all-electronic polar scanning, this being, in particular, spiral scanning in which the rate of change of the angular component is much higher, and the rate of change of the radial component is much lower, than the rates of change of the corresponding components used in scanning the screen of the indicator tube.

The camera tube shown herein is of the type which is known as a super-orthicon, this type of camera tube being preferred because its known great sensitivity will be advantageous for picking up low intensity afterglow and because it can be made to operate over a very wide contrast range, especially when its beam current is appropriately controlled. The magnetic deflection elements surrounding the neck of the camera tube comprise two fixed magnetic deflection coils each having a deflection axis whose direction is crosswise to that of the other. Each of these coils is fed with a train of sine waves having the same frequency, say a frequency of 10 kc. per second, the two trains being 90° out of phase. If these sine waves were to have equal and constant amplitudes a well-known circular sweep would be produced. However, each of the sine waves is amplitude modulated in accordance with a sawtooth wave of very much lower frequency with the result that at the beginning of each sawtooth wave the beam leaves the center of the photosensitive target; during the sawtooth wave it spirals outward toward the perimeter of the target traveling many times around the center before it reaches the perimeter, and at the end of the sawtooth it snaps back to the center after which this scanning cycle is repeated over and over again at the repetition rate of the sawtooth wave.

The beam projection on the target of the camera tube will have a particular angular position for each point in the cycle of each sine wave. For example, the projection will have a particular angular position, each time that one of the sine waves is at its first zero voltage point, i. e. each time that it is at the beginning of a cycle, and, since the two sine waves are 90° out of phase, the other one, at each of those times will be at either its negative or positive peak depending upon whether it is leading or lagging. According to the present invention either of the two sine waves, or a third sine wave produced by adding them, is passed through a series of distortion circuits (for example an amplifier-clipper and a differentiator) to generate at the beginning of each cycle a pulse which may be utilized for periodically varying the beam current of the camera tube. Since, to be exact, the beam is to be suppressed at intervals equal to one period of the sine wave plus or minus the number of degrees through which the sweep is moved in the meanwhile, each suppression occurring just as the spiraling projection crosses the position of the radial sweep, a phase shifting device is employed for controlling the timing of the pulses in accordance with movements of the radial sweep. The phase shifting device is initially adjusted, with the radial sweep maintained at a fixed position, so that the pulses will occur just as the spirally traveling projection crosses the stationary radial trace. Then, once this initial orientation has been made a movable element of the phase shifting device is mechanically coupled to the deflection coil of the indicator tube or to the means for angularly moving it. Once this is done the sweep may freely be angularly displaced since the said sine wave will be shifted in phase by an equal number of degrees and in the same direction. Therefore, whatever the angular position of the radial sweep the spirally scanning beam projection will be suppressed once for each revolution just as it crosses that position and at no other time.

Obviously, as an alternate means for effecting the initial orientation (and for making subsequent readjustments therein from time to time) the support of at least one of the tubes 1, 10 may be arranged to permit it to be angularly moved about the axis of its neck whereby the angular physical orientation of the actual tubes (to each other) will be changeable by an operator as desired.

In the illustrative embodiment shown herein the actual sine wave which is thus phase shifted in accordance with angular displacements with the deflection coil of the indicator tube is actually not one of the two sine waves feeding the deflection elements of the camera tube but rather a single sine wave produced by adding together those two waves. They are added together in a phase shifting device to produce an output sine wave whose phase will be a function of the individual phases and the relative phase of the two input sine waves and of the angular position of a rotatable element of the device.

In Fig. 1 plan position indicator tube 1 includes a fluorescent screen 2 and an electron gun (not fully shown) for producing electrons which will be directed onto screen 2. In the particular embodiment shown herein electrons from this gun are magnetically focused by a focusing coil 3 which is fed from a source of direct current (not shown). A rotatable deflection coil 4 is mounted about the neck of tube 1 with its axis of deflection transverse to the direction of the electron beam. Any suitable one of a number of well-known bearing means may be employed for rotatably supporting the deflection coil in this position. A source of sawtooth currents for radially deflecting the beam of tube 1 is connected to deflection coil 4, this source being represented as block 5. Deflection coil 4 may be angularly moved about its axis of rotation in accordance with the system employing indicator tube 1, for example it may be rotated in synchronism with the directive antenna of a radio detection and ranging apparatus so that at any instant the angular position of the radial sweep represents the direction of the main lobe of the antenna. For this purpose coil 4 may be directly connected to an antenna by any convenient mechanical linkage, such as a flexible shaft, or a Selsyn motor appropriately connected to a Selsyn generator, or a train of gears, or any other suitable means. As shown in Fig. 1 deflection coil 4 is rotated by the action of an electric motor 6 which is coupled to the deflection coil by a two-element gear train 7, 8. It may be assumed that some suitable means, not shown, is employed, if necessary, for synchronizing movements of coil 4 with those of a directive antenna or of some other cooperating element of the system employing indicator tube 1. However, the particular arrangement employed for this purpose is not an essential part of the present invention and therefore is not described in detail.

For illustrative purposes it may be assumed that in the polar plot to be presented on screen 2 radial distances measured from the center of the screen will represent ranges, and that, therefore, even for the maximum ranges which are reasonably attainable the radial speed of deflection will be very much greater than the angular displacements of the radial sweep even at its outer end. Therefore, tube 1 will have a substantially straight radial trace which will be systematically angularly displaced about one of its ends, i. e. about a center point of the screen. Video signals, for example impulses representing reflected electromagnetic waves returned from a detected object, are fed to a control grid 9 of tube 1 to intensity modulate the radial trace at a point along its length and in an angular position for representing data as to the position of the detected object. Camera tube 10 may be of the type of tube known as a super-orthicon. It is supported by any convenient means so that its photosensitive target 11 faces toward and registers with screen 2 of tube 1. If screen 2 and target 11 are positioned closely enough together an image of the polar plot produced on the former will impinge upon the latter without the assistance of a projecting lens system. However, if it is necessary that these elements be far apart then the best results will be obtained, as is well known, by using an appropriate optical system. The two fixed deflection coils employed for the all-electronic polar scanning, which has been described above, are represented by a block 12. As for the indicator tube the beam focusing arrangement for the camera tube comprises a focusing coil. This coil, which is represented by block 13, is fed from a source of direct current not shown. The camera tube will include a number of well-known elements, such as a gun for producing electrons to be directed at target 11 and an electron multiplier arrangement which is used in tubes of this type for increasing their sensitivity. However, the exact nature of these elements are no essential part of this invention and, therefore, they are not shown in detail. Instead the video output of camera tube 10 is diagrammatically represented as being derived directly from target 11 from which it is applied to a video amplifier 14.

The two sine waves used for sweeping the beam of the camera tube originate initially as a single sine wave produced by a sine wave generator 15 having an operating frequency of perhaps 10 kc. per second. The output of generator 15 divides into two branches 16 and 17. Branch 16 feeds sine waves to one of the fixed deflection coils 12 over a connection thereto including a means for amplitude modulating them. This connection does not include any circuits for deliberately changing the phase of these sine waves, though, of course, it is possible that some phase shift may occur due to the action of the modulating means, for example the sine waves may be inverted if the modulating means includes an odd number of stages of amplification. Branch 17 feeds sine waves to the other one of the fixed deflection coils 12 over a similar connection, i. e. a connection also including a means for amplitude modulating them. The modulating means in this connection is so arranged that any phase shifting which it may produce will equal the amount similarly produced in the connection for branch 16. However, the connection for branch 17 also includes a component which is deliberately added for producing an exact phase shift of 90°. This component is represented herein as block 18. This type of all electronic deflection apparatus is well known, as are the details of the 90° phase shifter. Therefore, they are represented by blocks to avoid unnecessary and burdensome details. For further details reference is made to page 399, "Review of Scientific Instruction," October 1946. A generator 19 provides sawtooth waves for amplitude modulating both of the sine waves fed to the deflection coils 12. Its output is fed over a connection 20 to an amplifier 21 from which it is fed in parallel to two modulator-amplifiers 22, 23 which act respectively to amplitude modulate the sine waves moving over the connection from branch 16 to tube 10 and those waves moving over the connection from branch 17 to tube 10.

Since the circuit details of the polar sweeping arrangement of the camera tube is not in itself an essential part of this invention, certain of them are excluded from the present showing, for example there is not shown any means for adjusting the center of the spiral; any means for adjusting the relative magnitudes of the two sine waves; any means for making vernier adjustments to compensate for any inaccuracy in the 90° phase shift produced by block 18; or any means for bucking out or eliminating, if necessary, any direct current components in the deflection currents produced in either of the two coils 12.

The portion of the apparatus used for modulating the beam current of the camera tube comprises blocks 24, 25, 26. Block 24 includes an electromechanical element shown in further detail in Figs. 2 and 2*a*. It may be considered as electrically equivalent to two condensers in series across each of which is fed one of the two 90° out-of-phase sine waves, the two condensers having a common rotatable dielectric so shaped, and so positioned with respect to the one common plate and the two individual plates for the two condensers, that as it is rotated the capacity of one of the condensers increases in a predetermined manner while that of the other decreases correspondingly, whereby the total voltage appearing across the two series condensers will undergo a phase shift which will be linearly proportional to any angular displacement of the shaft rotating the dielectric. In Fig. 2*a* the fixed plate 27 is common to the two series condensers and is grounded. There are two individual plates 28 and 29, one of which is directly connected to the output of sine wave generator over a conductor 30 and the other of which is connected to the output of sine wave generator 15, over a conductor 31, after that output has passed through phase shifter 18. Dielectric 32 is connected to a shaft 33 which is driven by a gear 34 which engages gear 7 of the train of gears 7, 8 described above. The gear ratio 7 to 34 must be identical to the gear ratio 7 to 8, but this ratio may be of any desired value for increasing the torque of motor 6 or for multiplying its rate of rotation.

It is obvious from what has been explained above, once a proper initial adjustment has been made of the angular position of dielectric 32 then thereafter, irrespective of the rate at which motor 6 is operated and irrespective of whether it is operated at all, the output of block 24 will be a sine wave, the beginning of each cycle of which may be conveniently used for producing an impulse for reducing the beam current of tube 10 each time that the spirally moving beam projection crosses the radial sweep of tube 1. To so utilize the sine wave output of block 24 it is passed through amplifier clipper 25. As will be seen from the first four plots of Fig. 3 the output of the amplifier clipper will be a train of square waves whose wave form includes a steep rise in the start of each cycle. This square wave is passed through a wave form generator 26 which may include a differentiator at its input and thereafter any one of a variety of well-known wave forming circuits to produce a transient having a predetermined wave form in response to each positive pip from the differentiator, i. e. each pip produced in synchronism with the beginning of a cycle of the output of block 24.

If wave form generator 26 comprises only a differentiator, the transient produced at the positive-going leading edge of each square wave will be a pip having a very steep positive-going leading edge and an exponential negative-going descent from that peak. This wave form may be fed to an amplifier stage operating at cut-off so that this positive pip will be inverted and so that all the negative pips produced by differentiating the output of block 25 will be eliminated. Thereafter the thus produced negative transients are fed over conductor 35 to the control electrode of tube 10. If the direction of the angular scanning component for tube 10 is opposite to that of the corresponding component for tube 1, this modulating voltage will act in an appropriate manner, i. e. it will sharply reduce the beam current of tube 10 just as the spirally scanning beam projection starts to coincide with the brilliant radial sweep of tube 1, and it will restore the beam current to its former value soon after the scanning projection has passed across the radial sweep but not so sharply as it reduced it. This in itself will effect a great improvement in the operation of the camera tube by sharply reducing its sensitivity in the presence of the brilliant flash thus avoiding the defocusing effect and effectively increasing its contrast range. While the reconstituted polar plot which will appear on the indicator tube of a receiving station will have a reduced contrast ratio this will not be a shortcoming inasmuch as the information contained in each picture element of a polar plot essentially comprises either the presence or the absence of light (produced either by on or off signals) rather than the presence of a particular relative level of light.

In addition to the contrast between the flash and the persistent image the latter may itself be much brighter when it is first written onto the screen than one revolution of the spiraling scan later. In other words even the persistent image may have a considerable contrast ratio. Therefore, for certain embodiments the beam current modulating wave should be effective over a considerable portion of each revolution of the spirally scanning beam of the camera tube. A wave form which may be suitable is illustrated as F in Fig. 3. One way in which such a wave form could be produced would be to employ in the output of the inverter tube (mentioned above as comprising a portion of block 26) a circuit consisting of a small condenser fed from the anode of that tube over a rectifier, which is connected to permit the condenser to rapidly acquire a negative charge for each negative output impulse from the tube, and a bleeder resistance of such value that the condenser will discharge during one revolution of the spiral scan. If the output impedance of this wave forming circuit should prove to be too high to match the input impedance of the control grid of the camera tube it may be desirable to couple it through a cathode follower. But this may not be the case and since it is a matter of design, it is not shown or dealt with herein in detail.

Wave forming circuits are very well known in the art therefore it is not necessary to illustrate by further examples how different wave forms could be generated so as to obtain the optimum adjustment of the beam current of camera tube 10 during each of its cycles of angular deflection about the center point of the spiral.

Obviously if the direction of the angular component of the scanning of tube 10 is the same as that of the radial sweep—the spiral scan however being so much faster that it periodically approaches and overtakes the slowly rotating sweep—then it would be necessary to employ a different wave forming circuit in block 26. In this case the output of block 26 would have to apply to the control grid of tube 10 a negative voltage which increases in a relatively gradual manner until the spiraling beam projection actually coincides with the brilliant radial sweep; to maintain it at a maximum negative value while it coincides therewith; and to abruptly reduce it to its original value after the beam projection has passed beyond the position of the radial sweep.

Similarly, it is obvious that instead of employing as the fixed setting for the beam current for tube 10 a relatively large value in combination with negative output impulses from block 26 for periodically reducing the fixed current, the fixed setting for the beam current may be of a relatively low value (for example the value appropriate for scanning the brilliant radial sweep) in combination with positive output pulses from block 26. In the latter case the impulses would serve to increase the beam current during the scanning of the relatively less brilliant portions of the polar plot image rather than the converse.

In Fig. 1 there is shown a monitoring viewing tube for permitting the operator of this television pick-up apparatus to make the necessary adjustments in order to check the quality of the video signals being transmitted to any receiving stations. The monitoring tube 36 includes fluorescent screen 37, an electron gun (not shown in detail) for producing electrons to be projected upon the screen, a magnetic focusing coil 38, a source of direct current (not shown) for feeding coil 38, and a pair of fixed deflection coils 39 corresponding to the coils 12 of the camera tube and individually fed with the same amplitude-modulated and 90°-phase-displaced sine waves feeding the coils 12. Thus monitoring tube 36 is spirally scanned in exact correspondence with the scanning of camera tube 10. There is fed to its control grid over a conductor 40 the video signals from the camera tube after they have been amplified by amplifier 14 from which they are also sent to a utilization output lead, serving for example to feed a transmitter or some other medium for transferring the video signals to one or more receiving stations.

It is apparent from the foregoing that in the arrangement shown herein the camera tube may employ a round target which is about the same size as the fluorescent screen of the plan position indicator and that the diameter of the camera tube can be approximately the same size as that of the indicator tube, thus permitting considerable economy. It is also apparent that since the time required for each revolution of the spiral scan of the camera tube is constant, whether said revolution is made near the center of the scan or near its perimeter, scanning errors which are small percentagewise, for example scanning errors due to slight distortions in the wave forms of the sine waves or to a slight fixed derivation from exactly 90° phase displacement between them, will not produce inordinately large distortions of the angular data shown in the polar plot being televised.

It is also apparent that relatively simple and inexpensive scanning circuits can be provided inasmuch as there is only one retrace for each field in the scanning of the camera tube. It is also apparent that in this kind of scanning arrangement it becomes feasible to devise economical and reliable circuits for modulating the beam current of the camera tube in accordance with the relative angular positions of the radial sweep and the spirally scanning of the camera tube.

It is obvious that the speed at which the electron beam traverses a mosaic element near the periphery of the camera tube target will be greater than that with which it traverses an element near its center. If desired the modulating sawtooth wave provided by generator 19 may be made exponential or otherwise non-linear so that equal areas will have approximately equal scan times and so that the polar plot image will be transmitted without intensification of the light in its center portion. If this is done, however, the same thing must be done at each receiving station to avoid inaccuracies in the transmitted range data.

If interlacing is desired, this can readily be accomplished by properly phasing the start of the radial sweeps with respect to the angular sweep. For example, if alternate radial sweeps are made to occur, respectively, at 0° and 180° points of the angular sweep, this will accomplish interlacing. This will not interfere with proper operation of the beam current modulating components.

In the apparatus shown herein a voltage transient for modulating the beam current of the camera tube will be produced each time that the spirally scanning beam projection crosses the rotating sweep irrespective of variations in the angular speed or direction of rotation of the sweep. However, that transient voltage may have a duration which is appropriate for one rotational speed for the sweep but not for another and it may have a direction of slope which is proper for rotations of the sweep in one direction but not for rotations in the opposite direction. For this reason in some embodiments it will be desirable to provide a first means for adjusting the wave forming circuits, for example for lengthening or shortening the discharge time of the small condenser mentioned above, to change the duration of the transient when the speed of the sweep is altered and a second means for adjusting the wave forming circuits so as to reverse the slope of the transients which it produces each time that the rotational direction of the radial sweep is reversed.

What is claimed is:

1. Apparatus for televising data visually represented as a polar plot on the screen of a cathode ray plan-position indicator tube having an angularly displaceable magnetic deflection coil comprising a camera tube having a photosensitive target for receiving an image of said polar plot, means for spirally scanning said target with a projection of the electron beam of the camera tube, the means for spirally scanning comprising a source of two sine waves having a 90° phase difference and means for amplitude modulating the sine waves in accordance with a sawtooth wave, and means for controlling the sensitivity of the camera tube including a phase shifting device for receiving the two sine waves and adding them together to produce a single sine wave, an angularly movable element in the device and an arrangement for angularly moving said element in synchronism with any angular movement of the displaceable deflection coil to shift said single sine wave in phase by the same number of degrees as said angular movement, a wave forming circuit for producing a voltage transient having a predetermined wave form in synchronism with each cycle of said single sine wave after its phase has been shifted by said device, and a connection from said circuit for feeding said transient voltage to a control electrode of the camera tube for varying its beam current in accordance with the relative angular positions of the radial sweep of the indicator tube and of the projection of the spirally scanning beam on said target.

2. Apparatus as in claim 1, and including a monitoring viewing tube, said monitoring viewing tube being connected through its control grid to the target of the camera tube, means for spirally scanning the viewing tube in synchronism with the spiral scanning of the camera tube, and means for feeding the video output of the camera tube to a control electrode of the monitoring tube for intensity modulating its electron beam.

3. Apparatus for televising data presented on a plan-position indicator tube including means for producing a radial scan on fluorescent screen thereof and means for angularly rotating the scan about a point on said screen comprising a cathode ray image pick-up device including a light sensitive mosaic for translating a light image into an electron image, means for producing a beam of electrons and projecting it on the mosaic, means for deflecting the electron beam for tracing a spiral scan over the mosaic screen, means for angularly rotating the plan-position indicator scan for producing an electrical signal whose instantaneous phase and amplitude represent the instantaneous angular position of the scanning means connected to the means for deflecting the electron beam of the cathode ray device to produce a second electrical signal whose instantaneous amplitude and phase represent the angular position of the beam projection of said device on said mosaic, means for receiving said first and second electrical signals to produce a modulating signal when a predetermined relationship exists between the amplitude and phase of said signals and means for applying said modulating signals to an electrode of the cathode ray device for intensity modulating said beam in a predetermined manner when the angular position of its projection on the mosaic has a predetermined relationship to the angular position of the plan-position indicator scan at the same instant.

4. Apparatus for televising as in claim 3, and including means for supporting the cathode ray device with its mosaic screen in predetermined spatial relationship to the screen of the plan-position indicator tube with the position of the center of the spiral corresponding to said central point of the plan-position indicator screen, and means for rotating the mosaic with respect to said screen about the center of said spiral.

5. Apparatus as in claim 3, also comprising a monitoring cathode ray device including a fluorescent screen, gun means for producing a beam of electrons and projecting them on the fluorescent screen, means for deflecting said beam to spirally scan said fluorescent screen in synchronism with said spiral scan of the mosaic, an electrode for intensity modulating the beam, and means for applying picture signals produced on said mosaic as it is scanned by the electron beam of said cathode ray device to said intensity modulating electrode to reproduce a facsimile of the image presented on the plan-position indicator tube and televised on the cathode ray device.

6. Apparatus for televising as in claim 3, in which the screen of the plan-position indicator tube comprises two fluorescent layers, one layer excitable by impingement of the electron beam for producing brilliant light of short persistence to excite the second layer and the second layer responding to excitement from the first layer to produce persistent light emissions so that the plan-position indicator tube during any instance while it is being scanned presents an image having a low intensity persistent portion which is slowly decaying and a relatively smaller portion having brilliant light emissions relatively rapidly decaying, the brilliant portions being near to the rotational position of the plan-position indicator scan at that instant, the means for controlling the portion and the amplitude of the intensity modulating signal for intensity modulating the beam of said cathode ray device to decrease its sensitivity while the projection of the beam is scanning a portion of the mosaic upon which the light from the brilliant portion of the plan-position indicator screen is impinging to improve the contrasting ratio of the pick-up cathode ray device.

7. Apparatus for televising as in claim 3, in which the beam of the pick-up cathode ray device is suppressed by the intensity modulating signals.

8. Apparatus for televising as in claim 3, in which the beam of the pick-up cathode ray device is increased in density by the modulating signal for all of the spiral scanning time except predetermined periods of time when the projection of the beam upon the mosaic is in angular positions which correspond in a predetermined manner with the angular position of the plan-position indicator trace.

9. Apparatus for televising data presented on a plan-position indicator tube including a fluorescent screen and means for sweeping an electron beam over that screen radially from a central point of origin and for angularly rotating the radial trace thus produced by said center point comprising a pick-up cathode ray device having a circular mosaic screen spatially positioned in a predetermined manner with respect to said indicator screen, means for producing a beam of electrons and directing it at the mosaic screen, means for deflecting the electron beam so that it traces a span over the mosaic screen from a central point of origin and an electrode for intensity modulating the beam of said device, means for intensity modulating the electron beam of the pick-up device in accordance with the relative positions on the plan-position indicator screen and said mosaic respectively of the beam projections of the plan-position indicator and of the pick-up device to improve the pick-up contrasting ratio of the pick-up device.

HENRY O. MARCY, 3RD.

(References on following page)

REFERENCES CITED

The following references are of record in the file of this patent:

UNITED STATES PATENTS

| Number | Name | Date |
|---|---|---|
| 1,747,988 | Sabbah | Feb. 18, 1930 |
| 2,077,442 | Tedham | Apr. 20, 1937 |
| 2,227,630 | Carnahan | Jan. 7, 1941 |
| 2,292,817 | Bedford | Aug. 11, 1942 |
| 2,312,954 | Boun | Mar. 2, 1943 |
| 2,404,173 | Hansen | July 16, 1946 |
| 2,415,981 | Wolf | Feb. 18, 1947 |
| 2,474,628 | Hurvitz | June 28, 1949 |

FOREIGN PATENTS

| Number | Country | Date |
|---|---|---|
| 315,362 | Great Britain | Feb. 12, 1931 |